(12) United States Patent
Kwon et al.

(10) Patent No.: US 7,744,049 B2
(45) Date of Patent: Jun. 29, 2010

(54) AUTOMATIC LEVEL CONTROLLING APPARATUS

(75) Inventors: Ho Cheol Kwon, Changwon-si (KR); Hack Jai Song, Changwon-si (KR); Beom Jun Kim, Changwon-si (KR); Il Jyeok Yim, Gyeonggi-do (KR); Kang Mo Choi, Masan-si (KR)

(73) Assignee: LG Electronics Inc., Seoul (KR)

( * ) Notice: Subject to any disclaimer, the term of this patent is extended or adjusted under 35 U.S.C. 154(b) by 352 days.

(21) Appl. No.: 10/584,124

(22) PCT Filed: Oct. 6, 2005

(86) PCT No.: PCT/KR2005/003316

§ 371 (c)(1),
(2), (4) Date: Jun. 23, 2006

(87) PCT Pub. No.: WO2006/080705

PCT Pub. Date: Aug. 3, 2006

(65) Prior Publication Data

US 2009/0039216 A1 Feb. 12, 2009

(30) Foreign Application Priority Data

Oct. 7, 2004 (KR) .................. 10-2004-0079793
Oct. 7, 2004 (KR) .................. 10-2004-0079794

(51) Int. Cl.
*F16M 11/20* (2006.01)
*A47B 91/00* (2006.01)

(52) U.S. Cl. .................. 248/188.3; 248/562; 312/351.3
(58) Field of Classification Search .............. 248/188.3, 248/562, 565, 599, 600, 602, 609, 615, 616, 248/631, 188.8; 312/351.3
See application file for complete search history.

(56) References Cited

U.S. PATENT DOCUMENTS

| 2,051,420 A | 8/1936 | Renholdt |
| 2,243,565 A * | 5/1941 | Kimball et al. .............. 210/365 |
| 2,520,366 A | 8/1950 | Kirby |
| 2,683,576 A | 7/1954 | Miller |

(Continued)

FOREIGN PATENT DOCUMENTS

CN 1290820 4/2001

(Continued)

OTHER PUBLICATIONS

International Search Report dated Jan. 13, 2006.

*Primary Examiner*—Anita M King
(74) *Attorney, Agent, or Firm*—McKenna Long & Aldridge LLP

(57) ABSTRACT

An automatic level controlling apparatus (100) for supporting an appliance includes a hollow leg body (110), a piston (140) inserted in the hollow leg body (110), a spring (130) seated on an upper portion of the piston (140), a cap (120) disposed on an upper portion of the piston (140) to support an upper portion of the spring (130), a frictional member (150) disposed around the piston (140), and a piston rod (160) coupled to the piston (140) and supported on a floor.

18 Claims, 6 Drawing Sheets

U.S. PATENT DOCUMENTS

| | | | | |
|---|---|---|---|---|
| 2,775,849 | A * | 1/1957 | Ingram | 248/188.3 |
| 2,795,892 | A * | 6/1957 | Lautenbacher et al. | 248/188.3 |
| 2,823,975 | A | 2/1958 | Kirby | |
| 2,852,883 | A * | 9/1958 | Walsh | 248/188.9 |
| 3,191,895 | A | 6/1965 | Whelan | |
| 3,459,395 | A * | 8/1969 | Scotto | 248/573 |
| 5,156,451 | A | 10/1992 | Pollock | |
| 7,597,295 | B2 * | 10/2009 | Neibert et al. | 248/188.3 |
| 2007/0023591 | A1 * | 2/2007 | Kwon et al. | 248/188.3 |

FOREIGN PATENT DOCUMENTS

| | | |
|---|---|---|
| KR | 2004-0079793 | 9/2004 |
| KR | 2004-0079794 | 9/2004 |

\* cited by examiner

[Fig. 1]

[Fig. 3]
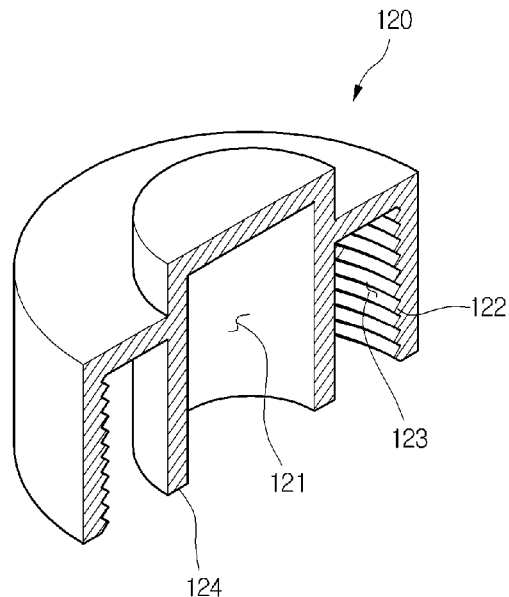
[Fig. 4]
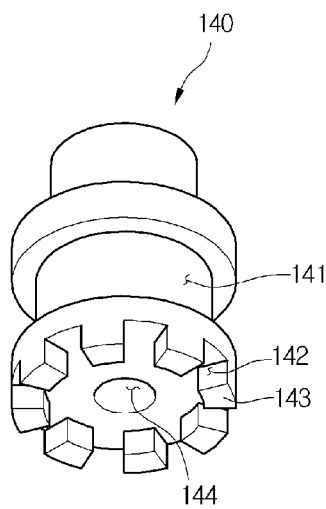
[Fig. 5]
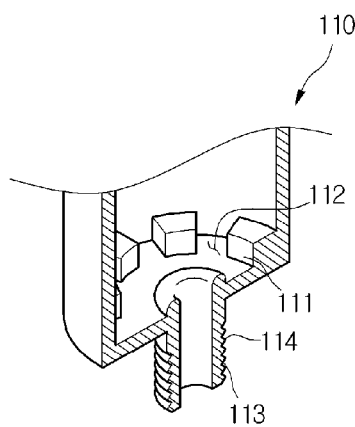

[Fig. 6]
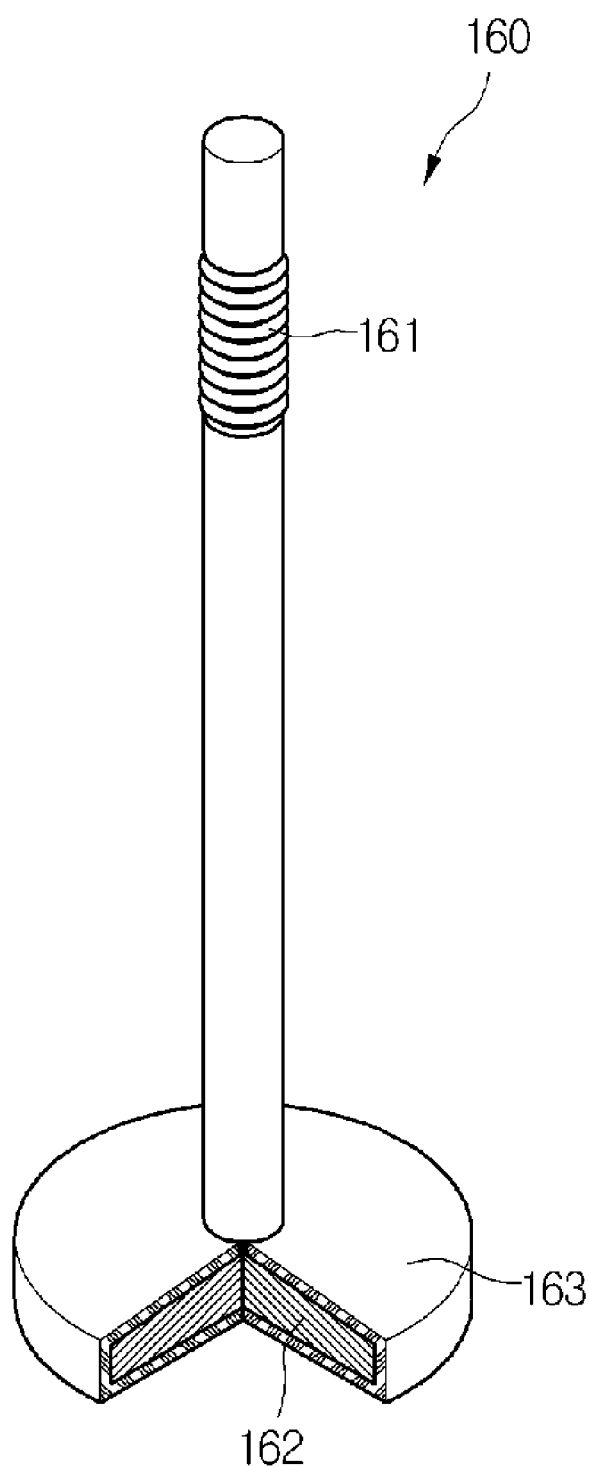

[Fig. 7]
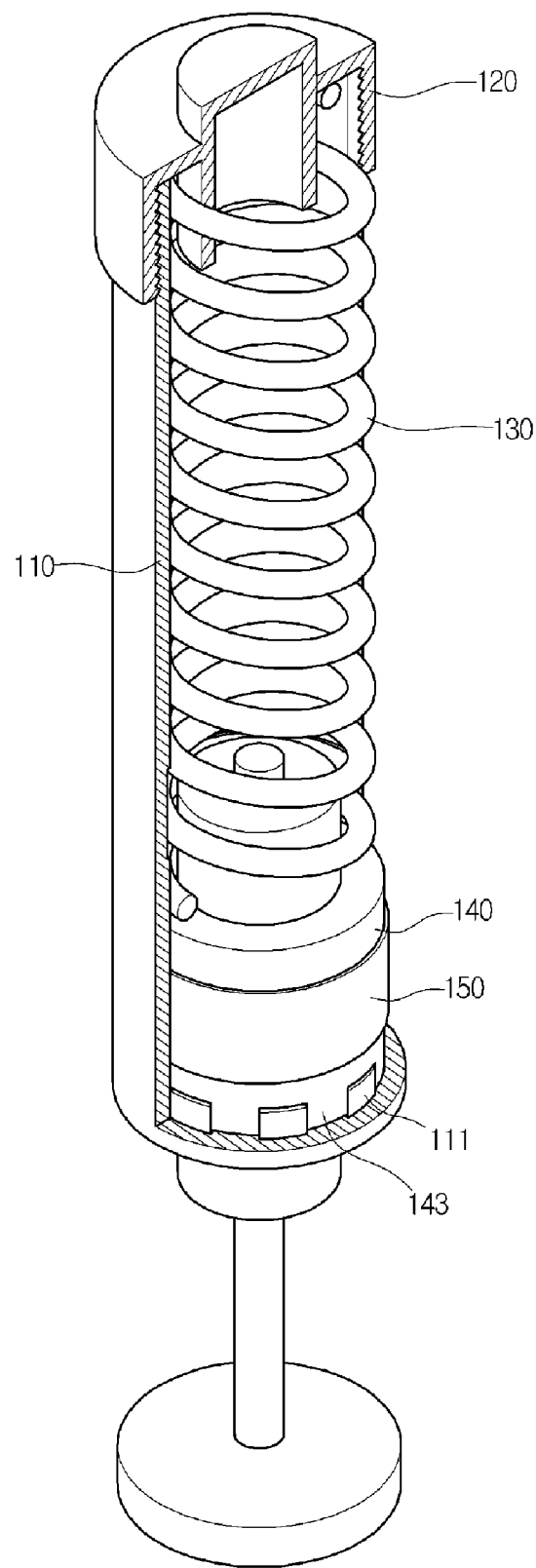

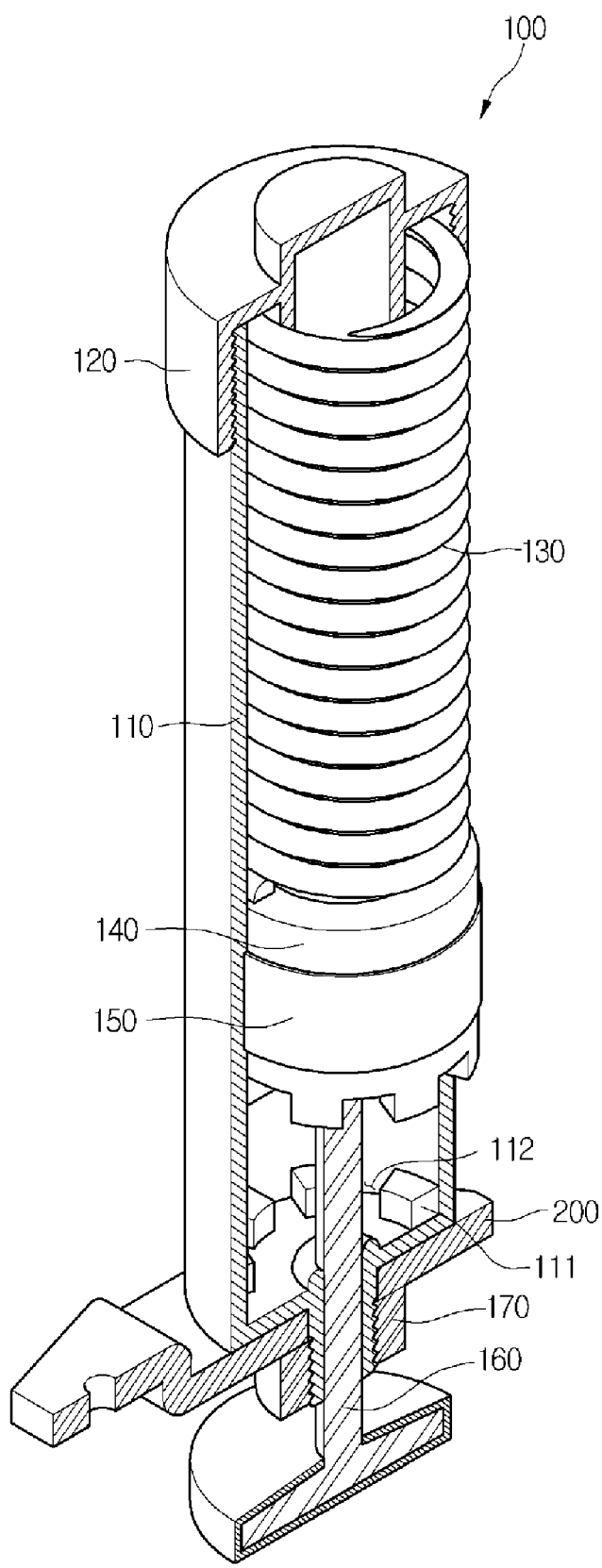
[Fig. 8]

AUTOMATIC LEVEL CONTROLLING APPARATUS

This application claims priority to International application No. PCT/KR2005/003316 filed on Oct. 6, 2005, Korean Application Nos. 10-2004-0079793 filed on Oct. 7, 2004 and 10-2004-0079794 filed on Oct. 7, 2004, all of which are incorporated by reference, as if fully set forth herein.

TECHNICAL FIELD

The present invention relates to an automatic level controlling apparatus that is mounted on a base of the machinery to make the machinery level and absorb vibration generated from the machinery. The present invention further relates to an automatic level controlling apparatus for supporting the load of the machinery such as a washing machine, which generates vibration, making a bottom of the machinery level, and attenuating the vibration generated from the machinery not to transmit the vibration generated from the machinery to a floor where the machinery is installed.

BACKGROUND ART

Generally, appliances such as a washing machine, a dishwasher, a refrigerator, and the like are designed in a hexahedral shape having fair corners on each of which a leg for controlling the level is mounted. The level is controlled by rotating the leg.

That is, in order to control the level of the appliances, the leg is provided at an cuter circumference with a screw so that the level can be adjusted while rotating the leg. However, such a level controlling structure has a problem in that the appliance must be lifted to rotate the leg. That is, it is very difficult for the aged and infirm to control the level of the appliance in a state where they are lifting the heavy appliance such as the washing machine and refrigerator.

Particularly, for the washing machine, since a large amount of vibration is generated during the washing process by the rotation of the washing tub. Therefore, the level controlling apparatus having the vibration absorbing function has been required.

To solve the above problem, an automatic leg structure that can control the level without rotating and effectively absorb the vibration generated during the operation of the washing machine has been proposed. The automatic leg is formed in a cylindrical shape, having a spring inserted therein. The level of the appliance can be automatically controlled while the spring is compressed by the self-gravity of the appliance.

That is, the automatic leg includes a leg body, a spring disposed in the leg body, a leg bolt inserted into the leg body and having a bottom contacting a floor, and a piston mounted on an upper-outer circumference of the leg bolt.

The leg bolt is inserted into the leg body and the piston mounted on the leg bolt contacts an inner circumference of the leg body. When the leg body descends by the self-gravity or vibration of the washing machine, the vibration can be absorbed by the spring.

DISCLOSURE OF INVENTION

Technical Problem

However, since the automatic leg is comprised of a number of components for coupling the leg bolt, the assembling process is complicated and the manufacturing cost is increased.

Furthermore, due to the large number of components, the overall size of the automatic leg is increased.

Technical Solution

Accordingly, the present invention is directed to an automatic level controlling apparatus that substantially obviates one or more problems due to limitations and disadvantages of the related art.

An object of the present invention is to provide an automatic level controlling apparatus that can be manufactured with the relatively small number of components, thereby saving the manufacturing costs.

Another object of the present invention is to provide an automatic level controlling apparatus that can effectively absorb the vibration generated when the appliance is operated.

Still another object of the present invention is to provide an automatic level controlling apparatus that can be designed in a small size by reducing the number of components so that it can be mounted on a location farthest from a bottom center of a washing machine, thereby improving the support of the load and effectively absorbing the vibration.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed cut in the written description and claims hereof as well as the appended drawings.

To achieve these objects and other advantages and in accordance with the purpose of the invention, as embodied and broadly described herein, there is provided an automatic level controlling apparatus for supporting an appliance, including: a hollow leg body; a piston inserted in the hollow leg body; a spring seated on an upper portion of the piston; a cap disposed on an upper portion of the piston to support an upper portion of the spring; a frictional member disposed around the piston; and a piston rod coupled to the piston and supported on a floor.

In another aspect of the present invention, there is provided an automatic level controlling apparatus for supporting an appliance, including: a hollow leg body; at least one hook projection extending upward from a bottom of the leg body; a cap disposed on an upper portion of the leg body; a piston inserted in the hollow leg body; at least one hook step extending upward from a bottom of the piston; a spring seated on an upper portion of the piston; and a piston rod coupled by penetrating a center of the piston and supported on a floor.

In still another aspect of the present invention, there is provided an automatic level controlling apparatus for supporting an appliance, including: a hollow leg body; a cap disposed on an upper portion of the leg body; a piston inserted in the leg body to be capable of vertically moving; a piston rod coupled by penetrating a center of the piston and supported on a floor; and a spring extending from an upper portion of the piston to a lower portion of the cap to provide force moving the lower portion of the piston to the lower portion of the leg body in a state where there is no cuter force.

It is to be understood that both the foregoing general description and the following detailed description of the present invention are exemplary and explanatory and are intended to provide further explanation of the invention as claimed.

ADVANTAGEOUS EFFECTS

According to the present invention, the assembling process of the components is simple and the size of the apparatus can be reduced. Furthermore, since the apparatus can be mounted on a portion furthest from the center of the bottom of the washing machine, the supporting performance of the washing machine can be dramatically improved.

In addition, by the frictional member mounted around the piston, the vibration absorbing efficiency can be further improved.

Furthermore, by improving the structure of the bottoms of the leg body and the piston, the idle of the piston can be prevented when the piston rod is coupled to the piston, thereby improving the user's convenience.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 3 is a partially broken perspective view of a cap depicted in FIGS. 1 and 2;

FIG. 4 is a perspective view of a piston depicted in FIGS. 1 and 2;

FIG. 5 is a partially broken perspective view of a leg body depicted in FIGS. 1 and 2;

FIG. 6 is a perspective view of the piston rod;

FIG. 7 is a view illustrating an automatic level controlling apparatus according to the present invention when a load is not applied to the automatic level controlling apparatus; and FIG. 8 is a view illustrating an automatic level controlling apparatus according to the present invention when a load is applied to the automatic level controlling apparatus.

BEST MODE FOR CARRYING OUT THE INVENTION

Reference will now be made in detail to the preferred embodiments of the present invention, examples of which are illustrated in the accompanying drawings. Wherever possible, the same reference numbers will be used throughout the drawings to refer to the same or like parts.

In the following embodiment, although a washing machine is exampled as an appliance where the inventive automatic level controlling apparatus is applied, the present invention is not limited to this. That is, the present invention can be applied to any of the appliances such as a dishwasher, a dryer and the like that generate load and vibration.

Figure 1:
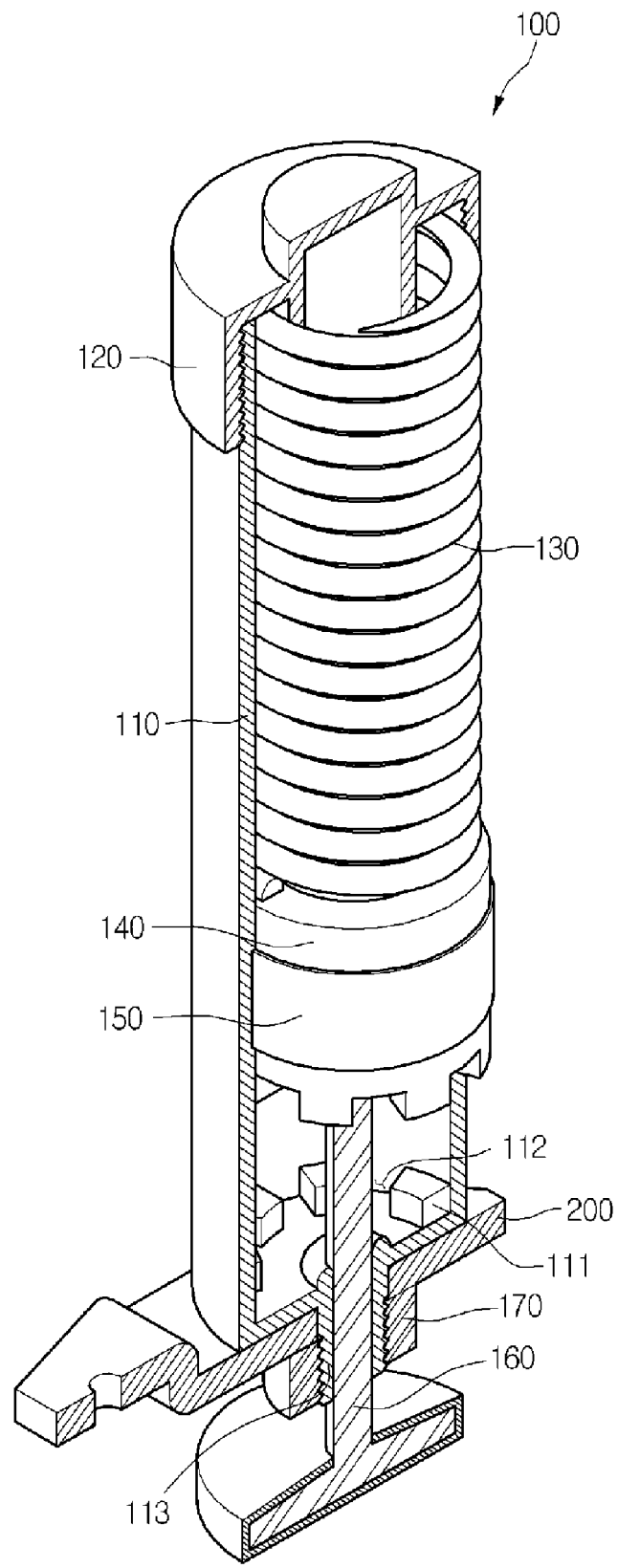
FIG. 1 is a partially broken perspective view of an automatic level controlling apparatus according to an embodiment of the present invention.
Figure 2:
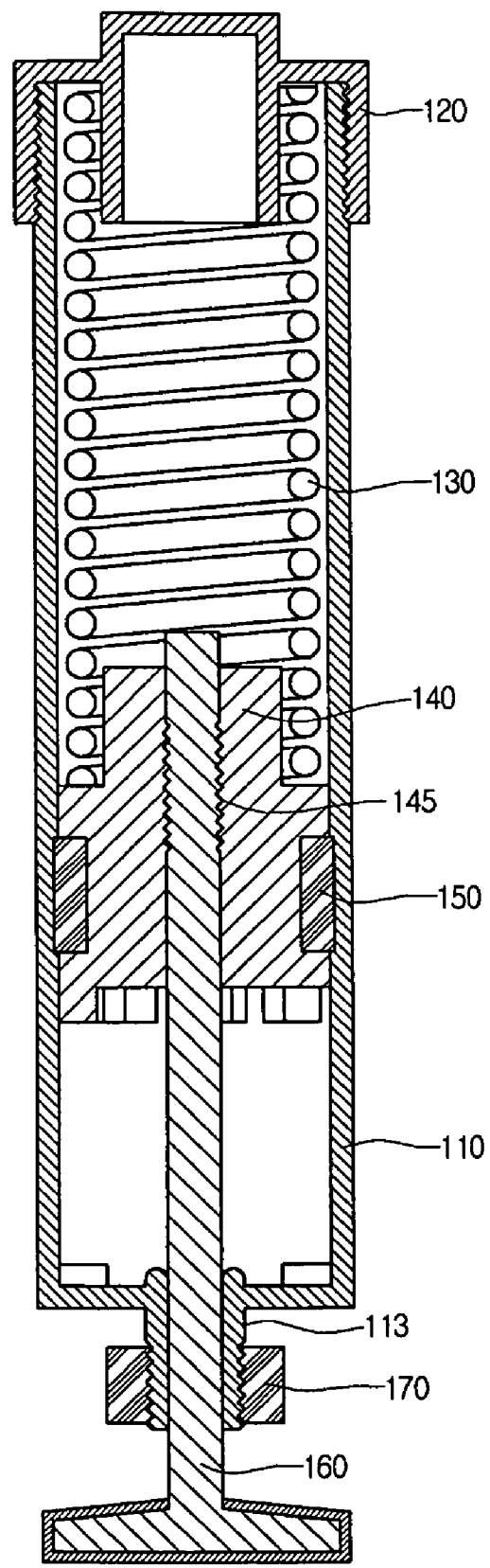
FIG. 2 is a vertical sectional view of an automatic level controlling apparatus according to an embodiment of the present invention.

FIG. 1 is a partially broken perspective view of an automatic level controlling apparatus according to an embodiment of the present invention and FIG. 2 is a vertical sectional view of the automatic level controlling apparatus depicted in FIG. 1.

Referring to FIGS. 1 and 2, the inventive automatic level controlling apparatus 100 includes a cylindrical leg body 110, a cap 120 covering an upper portion of the leg body 110, a piston 140 reciprocally inserted in the leg body 110, a spring 130 seating on an upper portion of the piston 140, a piston rod 160 inserted into the leg body 110 through a lower end of the leg body 110 and coupled to the piston by penetrating a center of the piston 140.

A piston rod guide 113 extends downward from the lower end of the leg body 110 and has a diameter less than that of the leg body 110. The piston rod 160 penetrates a center of the piston rod guide 113 and is inserted into the leg body 110.

A tighten nut 170 is fixed around the piston rod guide 113. That is, the tighten nut 170 is mounted on a lower end of a base 200 so that the automatic level controlling apparatus 100 can be securely coupled to the base 200 of the washing machine. When the tighten nut 170 is tightened, the lower end of the leg body 110 tightly contacts the base 200. The overall self-gravity of the washing machine is supported by the base 200. Therefore, the self-gravity and vibration of the washing machine are transmitted to the automatic level controlling apparatus 100. The identical results may occur even when the self-gravity and vibration are transmitted through the upper end or body of the automatic level controlling apparatus since the base 200 and the leg body 110 are coupled to each other.

A frictional member 150 is formed in a strip shape having a predetermined width around the piston 140. The frictional member 150 functions to absorb the vibration by the friction with the inner surface of the leg body 110. The frictional member 150 may be formed of a material such as felt that can effectively absorb the vibration or cuter impact.

The assembling process of the above-described automatic level controlling apparatus 100 will now be described.

First, the piston rod guide 113 is inserted into a groove formed on the base 200 and the tighten nut 170 is inserted around the piston rod guide 113. The tighten nut 170 is provided at an inner circumference with a thread and the piston rod guide 113 is provided at an cuter circumference with a thread so that the tighten nut 170 can be securely coupled to the piston rod guide 113. The tighten nut 170 is tightened so that the leg body 110 tightly contacts the base 200. At this point, the outer surface of the piston rod guide 113 is securely coupled to the inner surface of the tighten nut 170.

Since the leg body 110 is integrally formed with the piston rod guide 113, the leg body 110 is securely supported on the base 200.

After the above, the piston 140 is inserted into the leg body 110 through the upper end of the leg body 110 and the spring 130 is inserted into the leg body 110 and disposed on an upper portion of the piston 140. Then, the cap 120 is disposed to cover the upper end of the leg body 110. Here, since the inner circumference of the cap 120 and the upper-cuter circumference of the leg body 110 are respectively provided with threads, the cap 120 can be securely coupled to the leg body 110. When the cap 120 is fixed on the upper portion of the leg body 110, the piston 140 is depressed such that the spring 130 can be compressed by a predetermined length.

After the cap 120 is coupled to the upper end of the leg body 110, the piston rod 160 is inserted into the leg body 110 through the lower end of the leg body 110. The piston rod 160 penetrates the center of the piston rod guide 113 and is coupled to the piston 140. That is, by the threads formed on the piston rod 160 and the piston 140, the piston rod 160 and the piston 140 can be securely coupled to each other.

At this point, since a plurality of steps are formed on the lower end of the piston 140 and the bottom of the leg body 110, the idle of the piston 140 on the bottom of the leg body 110 during the coupling of the piston rod 160 can be prevented. Therefore, the assembling process or manipulation of the apparatus can be conveniently performed. Here, the steps are hooked on each other and formed in a radial direction from the center of the piston 140. This will be described in more detail later.

FIG. 3 is a partially broken perspective view of the cap.

Referring to FIG. 3, the cap 120 is coupled to the upper end of the leg body 110, by which the spring 130 inserted in the leg body 110 is compressed by a predetermined length. By the biasing force of the spring 130, the piston 140 is biased outward of the leg body 110.

The cap 120 is formed in a cylindrical shape having a predetermined diameter. The cap 120 is provided with a piston head insertion hole 121 for receiving a head portion of the piston 140. The leg body 110 and the spring 130 are inserted and supported in a space 123 defined between a guide sleeve 124 forming the piston head insertion hole 121 and an outer wall of the cap 120. The thread 122 is formed on the inner circumference of the cap 120 and coupled to the upper-outer circumference of the leg body 110. The spring is inserted between the leg body 110 and the guide sleeve 123.

FIG. 4 is a perspective view of the piston.

Referring to FIG. 4, the piston 140 is formed in a cylindrical shape and provided at an outer circumference with a seating groove 141 in which the frictional member 150 is received. The piston 140 is provided at a bottom with a hook step 143 extending from an edge to a center and a hook groove 142. The hook step 143 is inserted in a seating groove 112 formed on the bottom of the leg body 110 and a hook projection 111 formed on the bottom of the leg body 110 is inserted in the hook groove 142. Therefore, when the piston 140 reaches the bottom of the leg body 110, the relative location between the piston 140 and the leg body 110 is fixed not to idle. This can be realized by the hook projection 111, the hook step 143, the hook groove 142 and the seating groove 112, which define a relative rotation locking part.

However, the relative rotation locking part is not limited to the above. Other structure will be possible as far as it can prevent the piston 140 from rotating relative to the leg body 110 when the piston 140 descends to the bottom of the leg body 110 and can allow the piston 140 to rotate so that the frictional member 150 functions to attenuate the vibration when the piston 140 ascends from the bottom of the leg body 110 by a predetermined height.

In addition, the frictional member 150 is seated on the seating groove 141 formed on the outer circumference of the piston 140 and having a predetermined width and depth, thereby increasing the frictional force between the leg body 110 and the frictional member 150. As the frictional force is increased, the vibration and shock generated by the operation of the washing machine can be effectively attenuated by the automatic level controlling apparatus. The piston 140 is provided at a center with a piston rod penetration hole 144 through which the piston rod 160 penetrates. The thread (see the reference numeral 145 of FIG. 2) is formed on the inner circumference of the piston rod penetration hole 144 so that the piston rod 160 can be securely coupled to the piston rod 140.

FIG. 5 is a partly broken perspective view of a lower portion of the leg body.

Referring to FIG. 5, the hook projections 111 are formed on the inner bottom of the leg body 110 in a radial direction and the seating grooves 112 on which the hook steps 143 are disposed are formed between the hook projections 111. The tighten nut coupling portion 114 to which the tighten nut 170 is coupled is formed on the outer circumference of the piston rod guide 113 extending downward from the bottom of the leg body 110.

By the above-described structure, the piston 140 is disposed in the leg body 110 and the spring 130 disposed on the top of the piston 140 biases the piston 140. In addition, the hook step 143 and the hook grooves 142 that are formed on the bottom of the piston 140 are respectively engaged with the hook seating grooves 112 and the hook projections 11 that are formed on the bottom of the leg body 110. Therefore, when the piston rod 160 is coupled to the piston 140 while rotating in the piston 140, the idle of the piston 140 in the leg body 110 can be avoided. As a result, the convenience for the worker assembling the apparatus or the user can be improved.

FIG. 6 is a perspective view of the piston rod.

Referring to FIG. 6, the piston rod 160 has a predetermined diameter and length. A supporting plate 162 is formed on a lower end of the piston rod 160. The supporting plate 162 is enclosed and protected by a housing 163. The thread 161 is formed on a distal end portion of the supporting plate 162 and coupled to the piston 140.

FIG. 7 is a view illustrating the automatic level controlling apparatus according to the present invention when a load is not applied to the automatic level controlling apparatus and FIG. 8 is a view illustrating the automatic level controlling apparatus according to the present invention when a load is applied to the automatic level controlling apparatus.

Referring to FIGS. 7 and 8, when the load is applied to the upper portion of the automatic level controlling apparatus 100 or the base 200, the leg body 110 descends and the spring 130 disposed in the leg body 110 is compressed. Until the biasing force of the spring 130 becomes identical to the load of the washing machine, the leg body descends. As the leg body 110 descends, the bottom of the piston is separated from the bottom of the leg body 110.

Therefore, as far as the automatic level controlling apparatus 100 is installed any one of four corners, the washing machine maintains the stable position. That is, even when the levels of the rest three corners are not adjusted, the level of the washing machine can be stably maintained. That is, it will be enough to install the inventive automatic level controlling apparatus 100 on any one of the fair corners of the parallelepiped.

When the vertical vibration and impact generated when the drum of the washing machine rotates is transmitted to the automatic level controlling apparatus 100, the leg body 110 vertically moves by the spring operation of the spring 130. That is, as the piston 140 vertically moves in the leg body 110, the vibration and impact can be absorbed. The vertical vibration and impact can be also absorbed by the frictional force generated between the frictional member 150 and the inner circumference of the leg body 110.

Namely, the vibration and impact can be absorbed by both the elastic force of the spring and the frictional force generated by the frictional member 150. When the horizontal vibration is generated from the washing machine, it can be attenuated by the frictional force in a circumferential direction between the outer surface of the frictional member 150 and the inner surface of the leg body 110. To realize this, the frictional member 150 is seated on the seating groove 141 by a bonding or fitting method.

It will be apparent to those skilled in the art that various modifications and variations can be made in the present invention. Thus, it is intended that the present invention covers the modifications and variations of this invention provided they come within the scope of the appended claims and their equivalents.

For example, the relative rotation locking part is formed in the piston and leg body in the radial direction. However, the present invention is not limited to this case. An identical effect can be obtained even when a projection is formed on one of the piston and leg body and grooves are consecutively formed on the other of the piston and leg body.

In addition, instead of the thread, the components can be coupled to each other by other methods such as a bonding method.

Furthermore, although only one frictional member is provided in the above embodiment, the present invention is not limited to this case. That is, two or more frictional members can be provided.

INDUSTRIAL APPLICABILITY

According to the present invention, the assembling process of the components is simple and the size of the apparatus can be reduced. Furthermore, since the apparatus can be mounted on a portion furthest from the center of the bottom of the washing machine, the supporting performance of the washing machine can be dramatically improved.

In addition, by the frictional member mounted around the piston, the vibration absorbing efficiency can be further improved.

Furthermore, by improving the structure of the bottoms of the leg body and the piston, the idle of the piston can be prevented when the piston rod is coupled to the piston, thereby improving the user's convenience.

The invention claimed is:

1. An automatic level controlling apparatus for supporting an appliance, comprising:
    a hollow leg body;
    a piston inserted in the hollow leg body;
    a spring seated on an upper portion of the piston;
    a cap disposed on an upper portion of the leg body;
    a frictional member disposed around the piston; and
    a piston rod coupled to the piston and supported on a floor,
        wherein the piston and the leg body has a first operation mode where the piston and the leg body are capable of relatively rotating and a second operation mode where the piston and the leg body cannot relatively rotate.

2. The automatic level controlling apparatus according to claim 1, wherein the frictional member is formed in a strip-shaped strip.

3. The automatic level controlling apparatus according to claim 1, wherein a lower portion of the leg body is supported on the appliance.

4. The automatic level controlling apparatus according to claim 1, wherein frictional member is formed of felt.

5. The automatic level controlling apparatus according to claim 1, wherein the piston rod is provided at an outer surface with a tightening portion supporting the appliance upward.

6. The automatic level controlling apparatus according to claim 1, wherein the cap is fixed on the leg body.

7. The automatic level controlling apparatus according to claim 1, wherein the piston rod and the piston are coupled to each other not to relatively rotate.

8. The automatic level controlling apparatus according to claim 1, wherein the piston is provided at an outer surface with a seating groove in which the frictional member is disposed.

9. The automatic level controlling apparatus according to claim 1, wherein a relative rotation locking unit is formed between the piston and the leg body.

10. The automatic level controlling apparatus according to claim 9, wherein the relative rotation locking unit includes a projection formed on one of the piston and leg body and a groove formed on the other of the piston and leg body.

11. The automatic level controlling apparatus according to claim 1, wherein the relative rotation locking unit is formed on a lower portion of the piston.

12. The automatic level controlling apparatus according to claim 1, wherein a space for receiving the spring is formed below the cap.

13. An automatic level controlling apparatus for supporting an appliance, comprising:
    a hollow leg body;
    at least one hook projection extending upward from a bottom of the leg body;
    a cap disposed on an upper portion of the leg body;
    a piston inserted in the hollow leg body;
    at least one hook step extending downward from a bottom of the piston;
    a spring seated on an upper portion of the piston; and
    a piston rod coupled by penetrating a center of the piston and supported on a floor.

14. The automatic level controlling apparatus according to claim 13, wherein the hook step is formed in a radial direction from the center of the piston.

15. The automatic level controlling apparatus according to claim 13, wherein the piston includes hook steps and hook grooves formed between the hook steps and the hook projection is engaged with the hook groove.

16. An automatic level controlling apparatus for supporting an appliance, comprising:
    a hollow leg body;
    a cap disposed on an upper portion of the leg body;
    a piston inserted in the leg body to be capable of vertically moving;
    a piston rod coupled by penetrating a center of the piston and supported on a floor;
    a spring extending from an upper portion of the piston to a lower portion of the cap to provide force moving the lower portion of the piston to the lower portion of the leg body in a state where there is no outer force; and
    a relative rotation locking unit to prevent the piston from relatively rotating on the leg body when the lower portion of the piston contacts the lower portion of the leg body.

17. The automatic level controlling apparatus according to claim 16, further comprising a frictional member disposed around the piston and contacting the leg body.

18. An automatic level controlling apparatus for supporting an appliance, comprising:
    a hollow leg body;
    a piston inserted in the leg body to be capable of vertically moving;
    a spring seated on an upper portion of the piston;
    a cap disposed on an upper portion of the leg body;
    a frictional member disposed around the piston and moving with the piston;
    a seating groove provided at an outer circumference of the piston to receive the frictional member;
    a piston rod coupled to the piston and supported on a floor; and
    a relative rotation locking unit formed between the piston and the leg body to prevent the piston from relatively rotating on the leg body.

* * * * *